US010883664B2

(12) United States Patent
Heydorn et al.

(10) Patent No.: US 10,883,664 B2
(45) Date of Patent: Jan. 5, 2021

(54) FUEL GAS DISTRIBUTION METHOD

(71) Applicant: Air Products and Chemicals, Inc., Allentown, PA (US)

(72) Inventors: Edward Clyde Heydorn, Macungie, PA (US); Brian Bernard Bonner, Nesquehoning, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 58 days.

(21) Appl. No.: 15/879,579

(22) Filed: Jan. 25, 2018

(65) Prior Publication Data

US 2019/0226638 A1 Jul. 25, 2019

(51) Int. Cl.
| | |
|---|---|
| *F17C 9/00* | (2006.01) |
| *F17C 13/00* | (2006.01) |
| *F17C 13/08* | (2006.01) |
| *F17C 9/04* | (2006.01) |

(52) U.S. Cl.
CPC .................. *F17C 9/00* (2013.01); *F17C 9/04* (2013.01); *F17C 13/005* (2013.01); *F17C 13/083* (2013.01); *F17C 2201/0109* (2013.01); *F17C 2205/013* (2013.01); *F17C 2205/0142* (2013.01); *F17C 2205/0157* (2013.01); *F17C 2221/012* (2013.01); *F17C 2221/033* (2013.01); *F17C 2223/0161* (2013.01); *F17C 2223/033* (2013.01); *F17C 2225/013* (2013.01); *F17C 2225/0146* (2013.01); *F17C 2225/0161* (2013.01); *F17C 2225/033* (2013.01); *F17C 2227/0128* (2013.01); *F17C 2227/04* (2013.01); *F17C 2265/032* (2013.01); *F17C 2265/063* (2013.01); *F17C 2265/065* (2013.01); *F17C 2265/066* (2013.01); *F17C 2270/0171* (2013.01); *F17C 2270/0184* (2013.01); *F17C 2270/0581* (2013.01)

(58) Field of Classification Search
CPC .. F17C 9/00; F17C 9/04; F17C 13/083; F17C 2205/0157; F17C 2270/0581; F17C 2270/0184; F17C 2270/0168; F17C 2223/0153; F17C 5/02; F17C 9/02; H01M 8/04089; H01M 8/04208; B60K 3/00; B60P 3/22
See application file for complete search history.

(56) References Cited

U.S. PATENT DOCUMENTS 3,257,031 A * 6/1966 Dietz ........................ B60P 3/14
                                                         222/23
3,547,141 A * 12/1970 Long ........................ F17D 1/08
                                                         137/263
(Continued)

FOREIGN PATENT DOCUMENTS

| CA | 2914246 A1 | 12/2015 |
|---|---|---|
| EP | 3249281 A1 | 5/2016 |

(Continued)

*Primary Examiner* — Ljiljana V. Ciric
(74) *Attorney, Agent, or Firm* — Matthew R. Weaver

(57) ABSTRACT

Fuel gas distribution method where residual fuel gas in a mobile fuel gas storage vessel being transported by a transport vehicle is transferred from the mobile fuel gas storage vessel to the transport vehicle for generating power. The fuel gas may be natural gas or hydrogen. The transport vehicle may be a fuel cell vehicle.

14 Claims, 2 Drawing Sheets

(56) References Cited

U.S. PATENT DOCUMENTS

| | | | | |
|---|---|---|---|---|
| 3,677,284 A * | 7/1972 | Mendez | B60K 15/063 | 137/351 |
| 4,139,019 A * | 2/1979 | Bresie | F17C 5/002 | 137/351 |
| 4,211,537 A * | 7/1980 | Teitel | C01B 3/0005 | 48/191 |
| 5,373,700 A * | 12/1994 | McIntosh | F02M 21/06 | 62/48.1 |
| 5,406,988 A * | 4/1995 | Hopkins | F17C 7/00 | 123/527 |
| 5,409,046 A * | 4/1995 | Swenson | F17C 9/02 | 141/11 |
| 5,538,051 A * | 7/1996 | Brown | F17C 5/06 | 123/525 |
| 5,603,360 A * | 2/1997 | Teel | F17C 5/06 | 137/267 |
| 5,651,400 A * | 7/1997 | Corts | B67D 7/365 | 141/198 |
| 5,660,358 A * | 8/1997 | Grafwallner | B64D 37/14 | 244/135 R |
| 5,673,735 A * | 10/1997 | Crvelin | F17C 13/045 | 137/256 |
| 5,682,750 A * | 11/1997 | Preston | F17C 9/00 | 62/50.2 |
| 5,762,119 A * | 6/1998 | Platz | F17C 5/06 | 141/18 |
| 5,810,058 A * | 9/1998 | Kountz | F17C 5/06 | 141/18 |
| 5,884,675 A * | 3/1999 | Krasnov | F17C 5/06 | 141/18 |
| 5,887,567 A * | 3/1999 | White | F02M 21/029 | 123/294 |
| 6,058,713 A * | 5/2000 | Bowen | F02M 21/0242 | 62/7 |
| 6,305,442 B1 * | 10/2001 | Ovshinsky | C01B 3/0057 | 141/231 |
| 6,564,615 B1 * | 5/2003 | Carter | B67D 7/085 | 73/49.2 |
| 6,651,701 B2 * | 11/2003 | Kuriiwa | C01B 3/0005 | 141/4 |
| 6,745,801 B1 * | 6/2004 | Cohen | C01B 3/02 | 141/231 |
| 6,755,225 B1 * | 6/2004 | Niedwiecki | B60P 3/14 | 141/231 |
| 6,786,245 B1 | 9/2004 | Eichelberger et al. | | |
| 7,059,364 B2 * | 6/2006 | Kountz | F17C 9/02 | 141/4 |
| 7,124,790 B2 * | 10/2006 | Bushko | H01M 8/04089 | 141/82 |
| 7,128,103 B2 * | 10/2006 | Mitlitsky | H01M 8/04089 | 141/248 |
| 7,249,617 B2 * | 7/2007 | Musselman | G05D 16/2046 | 128/200.24 |
| 7,264,025 B2 * | 9/2007 | Farese | F17C 9/02 | 141/2 |
| 7,325,561 B2 * | 2/2008 | Mathison | G05D 16/2046 | 137/256 |
| 7,328,728 B1 * | 2/2008 | Vilar | B60P 3/14 | 137/565.17 |
| 7,360,563 B2 * | 4/2008 | Mitlitsky | F17C 5/06 | 141/2 |
| 7,568,507 B2 * | 8/2009 | Farese | F17C 5/06 | 141/95 |
| 7,602,143 B2 * | 10/2009 | Capizzo | B60L 53/305 | 320/109 |
| 7,610,806 B2 * | 11/2009 | Skinner | G01F 23/2963 | 73/290 R |
| 7,790,013 B2 * | 9/2010 | McClaine | B01J 8/20 | 205/637 |
| 7,937,215 B2 * | 5/2011 | Humphrey | G01F 15/061 | 702/55 |
| 7,938,151 B2 * | 5/2011 | Hockner | B60P 3/228 | 141/95 |
| 7,951,349 B2 * | 5/2011 | Kindler | H01M 8/0656 | 423/416 |
| 7,980,344 B2 * | 7/2011 | Kubo | F17C 11/005 | 180/68.1 |
| 8,069,885 B2 * | 12/2011 | Kederer | F17C 5/007 | 141/104 |
| 8,122,918 B2 * | 2/2012 | Handa | F17C 5/00 | 141/95 |
| 8,215,342 B2 * | 7/2012 | McLean | H01M 8/04208 | 141/11 |
| 8,360,115 B2 * | 1/2013 | Trattner | F02M 37/0088 | 141/59 |
| 8,814,962 B2 * | 8/2014 | McAlister | B01J 19/24 | 48/61 |
| 8,967,174 B1 * | 3/2015 | Perreault | B63B 27/30 | 137/1 |
| 9,102,528 B2 * | 8/2015 | Wallace | C01B 3/06 | |
| 9,181,078 B2 * | 11/2015 | Cajiga | B60S 5/02 | |
| 9,321,467 B2 * | 4/2016 | Frazier | B61C 17/02 | |
| 9,434,598 B2 * | 9/2016 | Pick | B67D 7/04 | |
| 9,850,845 B2 * | 12/2017 | Sloan | B60K 15/03006 | |
| 10,077,998 B2 * | 9/2018 | Mathison | F17C 13/023 | |
| 10,240,721 B2 * | 3/2019 | Dawson | F17C 5/06 | |
| 10,486,966 B2 * | 11/2019 | Lugtigheid | C01B 3/065 | |
| 10,508,770 B2 * | 12/2019 | Cohen | F17C 5/06 | |
| 10,634,283 B2 * | 4/2020 | Nagura | F17C 5/06 | |
| 10,663,115 B2 * | 5/2020 | Kaminsky | F17C 7/02 | |
| 10,759,649 B2 * | 9/2020 | Haile | B67D 7/04 | |
| 10,773,822 B2 * | 9/2020 | Haberbusch | F17C 5/02 | |
| 2002/0014277 A1 * | 2/2002 | Togasawa | F17C 5/06 | 141/95 |
| 2002/0029820 A1 * | 3/2002 | Ovshinsky | C22C 1/04 | 141/110 |
| 2004/0123898 A1 * | 7/2004 | Yamashita | F16K 31/1635 | 137/7 |
| 2005/0000802 A1 * | 1/2005 | Hobbs | C01B 3/34 | 204/277 |
| 2005/0008904 A1 * | 1/2005 | Suppes | H01M 8/186 | 429/9 |
| 2005/0109561 A1 * | 5/2005 | Chopra | F01M 11/12 | 184/103.1 |
| 2007/0181212 A1 * | 8/2007 | Fell | B60P 3/14 | 141/231 |
| 2009/0071652 A1 * | 3/2009 | Vinegar | E21B 43/24 | 166/303 |
| 2009/0151812 A1 * | 6/2009 | Allidieres | F17C 5/007 | 141/11 |
| 2009/0236006 A1 * | 9/2009 | Farese | F17C 5/06 | 141/3 |
| 2009/0314384 A1 * | 12/2009 | Brakefield | B67D 7/04 | 141/67 |
| 2010/0076615 A1 * | 3/2010 | Daniel | H02J 3/28 | 700/293 |
| 2010/0193070 A1 * | 8/2010 | Allidieres | F17C 5/06 | 141/11 |
| 2010/0282644 A1 * | 11/2010 | O'Connor | E21B 43/164 | 208/427 |
| 2013/0206910 A1 * | 8/2013 | Stolte | A62C 99/0018 | 244/129.2 |
| 2013/0240080 A1 | 9/2013 | Pick et al. | | |
| 2014/0158224 A1 | 6/2014 | Brown | | |
| 2015/0211684 A1 * | 7/2015 | Santos | F17C 13/00 | 137/1 |
| 2016/0116113 A1 * | 4/2016 | Mrowzinski | F17C 5/007 | 141/4 |
| 2016/0169449 A1 * | 6/2016 | Allidieres | F17C 5/007 | 141/4 |
| 2017/0244120 A1 * | 8/2017 | Holladay | F25J 1/001 | |
| 2017/0341769 A1 * | 11/2017 | Haberbusch | B64C 39/024 | |
| 2018/0201352 A1 * | 7/2018 | Trincia | B63B 25/16 | |
| 2019/0112188 A1 * | 4/2019 | Subbaraman | B01D 53/62 | |

(56) References Cited

U.S. PATENT DOCUMENTS

2020/0164840 A1\* 5/2020 Smith ................... F17C 9/02
2020/0173608 A1\* 6/2020 Heisch .................. F17C 5/02

FOREIGN PATENT DOCUMENTS

| EP | 3263969 A1 | 6/2016 |
|----|------------|--------|
| EP | 3249282 A1 | 3/2017 |
| JP | 2007247729 A | 9/2007 |
| JP | 2009236270 A | 10/2009 |
| JP | 2013032271 A | 2/2013 |
| JP | 2013040648 A | 2/2013 |
| WO | 2018-206510 A1 \* | 11/2018 |

\* cited by examiner

FUEL GAS DISTRIBUTION METHOD

BACKGROUND

Use of fuel gases such as natural gas and hydrogen as transportation fuels, are gaining greater acceptance. These fuel gases need to be distributed to dispensing stations where the fuel gases are subsequently dispensed to fuel tanks in vehicles, for example, fuel cell vehicles.

Fuel gases are often transported from a fuel gas source in one or more mobile fuel gas storage vessels by a vehicle (i.e. a truck) to a dispensing station. At the dispensing station, the fuel gas is off-loaded, either by transferring the fuel gas from the one or more mobile fuel gas storage vessels to fixed storage vessels at the dispensing station, or by leaving the one or more mobile fuel gas storage vessels at the dispensing station for dispensing fuel gas directly from the one or more mobile fuel gas storage vessels to fuel tanks in vehicles. Distribution of fuel gas is described, for example, in EP 3 249 281, EP 3 249 282, EP 3 263 969, and U.S. Pat. No. 6,786,245, each incorporated herein by reference.

After the fuel gas has been off-loaded, the one or more mobile fuel gas storage vessels are transported back to a refilling station where the one or more mobile fuel gas storage vessels are refilled. A residual amount of fuel gas remains in each of the one or more mobile fuel gas storage vessels when one or more mobile fuel gas storage vessels are transported back to the refilling station. This residual amount of fuel gas is sometimes called the "heel". This residual amount of fuel gas that is transported back to the refilling station represents an inefficiency in the distribution of the fuel gas.

Industry desires greater utilization of fuel gases in the distribution of the fuel gases.

BRIEF SUMMARY

The present disclosure relates to a fuel gas distribution method.

There are several aspects of the invention as outlined below. In the following, specific aspects of the invention are outlined below. The reference numbers and expressions set in parentheses are referring to an example embodiment explained further below with reference to the figures. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. A fuel gas distribution method comprising:
transporting a mobile fuel gas storage vessel (20) to a delivery location;
off-loading fuel gas from the mobile fuel gas storage vessel (20) at the delivery location until the mobile fuel gas storage vessel (20) has been depleted to a depletion level, the mobile fuel gas storage vessel (20) having a residual amount of gaseous fuel gas contained therein;
providing a connection (40) between the mobile fuel gas storage vessel (20) and a power generator (50) of a transport vehicle (10) for transfer of gaseous fuel gas from the mobile fuel gas storage vessel (20) to the power generator (50) of the transport vehicle (10);
transporting the mobile fuel gas storage vessel (20) using the transport vehicle (10) while transferring a portion of the residual amount of gaseous fuel gas from the mobile fuel gas storage vessel (20) to the transport vehicle (10) and consuming the portion of the residual amount of gaseous fuel gas in the power generator (50) to generate power for the transport vehicle (10).

Aspect 2. The fuel gas distribution method according to aspect 1 wherein the fuel gas is off-loaded to a fuel gas dispensing station (30) at the delivery location.

Aspect 3. The fuel gas distribution method according to aspect 2, the method further comprising
dispensing fuel gas from the dispensing station (30) to a plurality of receiving vessels;
wherein each receiving vessel of the plurality of receiving vessels is an onboard storage vessel on board a respective vehicle.

Aspect 4. The fuel gas distribution method according to any one of aspects 1 to 3 wherein the mobile fuel gas storage vessel (20) is transported to a refilling station (60) in the step of transporting the mobile fuel gas storage vessel using the transport vehicle (10), the method further comprising:
refilling the mobile fuel gas storage vessel (20) with fuel gas at the refilling station (60).

Aspect 5. The fuel gas distribution method according to any one of aspects 1 to 4 wherein the mobile fuel gas storage vessel (20) is one of a plurality of physically-connected mobile fuel gas storage vessels (20, 21, 22, 23),
wherein the plurality of physically-connected mobile fuel gas storage vessels (20, 21, 22, 23) are transported to a second delivery location using the transport vehicle (10), the method further comprising:
off-loading fuel gas from a second mobile fuel gas storage vessel (21) of the plurality of physically-connected mobile fuel gas storage vessels (20, 21, 22, 23) at the second delivery location.

Aspect 6. The fuel gas distribution method according to any one of aspects 1 to 5 wherein the mobile fuel gas storage vessel (20) is adapted to store liquid fuel gas,
wherein the mobile fuel gas storage vessel (20) is transported to the delivery location by the transport vehicle (10);
wherein a portion of the liquid fuel gas evaporates to form vaporized gaseous fuel gas during transport of the mobile fuel gas storage vessel (20) by the transport vehicle (10); and
wherein the connection (40) is provided between the mobile fuel gas storage vessel (20) and the power generator (50) of the transport vehicle (10) for transfer of gaseous fuel gas from the mobile fuel gas storage vessel (20) to the power generator (50) of the transport vehicle (10);
the method further comprising:
transferring the vaporized gaseous fuel gas from the mobile fuel gas storage vessel (20) to the power generator (50) of the transport vehicle (10) and consuming the vaporized gaseous fuel gas to generate power for the transport vehicle (10) while transporting the mobile fuel gas storage vessel (20) to the delivery location.

Aspect 7. The fuel gas distribution method according to any one of aspects 1 to 5
wherein the mobile fuel gas storage vessel (20) is transported to the delivery location using a second transport vehicle (11);
wherein the step of off-loading fuel gas comprises:
detaching the mobile fuel gas storage vessel (20) from the second transport vehicle (11) at the delivery location; and
operatively connecting the mobile fuel gas storage vessel (20) to a fuel gas receiving coupler at the delivery location.

Aspect 8. The fuel gas distribution method according to aspect 7 wherein the mobile fuel gas storage vessel (20) is adapted to store liquid fuel gas, wherein a portion of the liquid fuel gas evaporates to form vaporized gaseous fuel gas during transport of the mobile fuel gas storage vessel (20) by the second transport vehicle (11);

the method further comprising:

providing a connection (42) between the mobile fuel gas storage vessel (20) and a power generator (51) of the second transport vehicle (11) for transfer of the vaporized gaseous fuel gas from the mobile fuel gas storage vessel (20) to the power generator (51) of the second transport vehicle (11); and transferring the vaporized gaseous fuel gas from the mobile fuel gas storage vessel (20) to the power generator (51) of the second transport vehicle (11) and consuming the vaporized gaseous fuel gas to generate power for the second transport vehicle (11) while transporting the mobile fuel gas storage vessel (20) to the delivery location.

Aspect 9. The fuel gas distribution method according to any one of aspects 1 to 8 wherein the step of off-loading fuel gas comprises:

operatively connecting the mobile fuel gas storage vessel (20) to one or more fixed storage vessels (31) at the delivery location; and transferring fuel gas from the mobile fuel gas storage vessel (20) to the one or more fixed storage vessels (31) at the delivery location.

Aspect 10. The fuel gas distribution method according to any one of aspects 1 to 9 wherein the transport vehicle (10) comprises a primary fuel gas storage vessel (45) which is fixed to the transport vehicle (10), and wherein transferring the portion of the residual amount of fuel gas from the mobile fuel gas storage vessel (20) to the transport vehicle (10) comprises transferring fuel gas from the mobile fuel gas storage vessel (20) to the primary fuel gas storage vessel (45).

Aspect 11. The fuel gas distribution method according to any one of aspects 1 to 10 wherein the transport vehicle (10) comprises a primary fuel gas storage vessel (45) which is fixed to the transport vehicle (10), and wherein transferring the portion of the residual amount of fuel gas from the mobile fuel gas storage vessel (20) to the transport vehicle (10) comprises transferring fuel gas from the mobile fuel gas storage vessel (20) directly to the power generator (50) of the transport vehicle (10), bypassing the primary fuel gas storage vessel (45).

Aspect 12. The fuel gas distribution method according to any one of claims 1 to 11 wherein the power generator (50) is an internal combustion engine for driving the transport vehicle (10) and/or generating electric power for operating one or more electric components of the transport vehicle (10).

Aspect 13. The fuel gas distribution method according to any one of claims 1 to 11 wherein the power generator (50) is a fuel cell for generating electric power for operating one or more electric components of the transport vehicle (10).

Aspect 14. The fuel gas distribution method according to the preceding claim wherein the transport vehicle (10) comprises an electric motor for driving the transport vehicle (10), and the fuel cell delivers electric power to the electric motor.

Aspect 15. A fuel gas distribution system comprising:

a mobile fuel gas storage vessel (20) containing a liquid and/or compressed fuel gas;

a first transport vehicle (10) comprising a power generator (50) to generate power for the first transport vehicle (10) and a primary fuel gas storage vessel (45) which is fixed to the first transport vehicle (10) and connected with the power generator (50) of the first transport vehicle (10) to supply fuel gas to this power generator (50); and a second transport vehicle (11) comprising a power generator (51) to generate power for the second transport vehicle (11) and a primary fuel gas storage vessel (46) which is fixed to the second transport vehicle (11) and connected with the power generator (51) of the second transport vehicle (11) to supply fuel gas to this power generator (51);

each of the transport vehicles (10, 11) configured to transport the mobile fuel gas storage vessel (20) to a delivery location for off-loading fuel gas from the mobile fuel gas storage vessel (20) at the delivery location;

wherein the mobile fuel gas storage vessel (20) and/or each of the first transport vehicle (10) and the second transport vehicle (11) is/are provided with a respective connecting line and/or a coupling to provide a connection (40, 42) between the mobile fuel gas storage vessel (20) and the power generator (50; 51) of the respective one of the first and second transport vehicles (10, 11) for transfer of gaseous fuel gas from the mobile fuel gas storage vessel (20) to the power generator (50, 51) of the respective one of the first and second transport vehicles (10, 11).

DETAILED DESCRIPTION OF THE PREFERRED EMBODIMENTS

Figure 1:
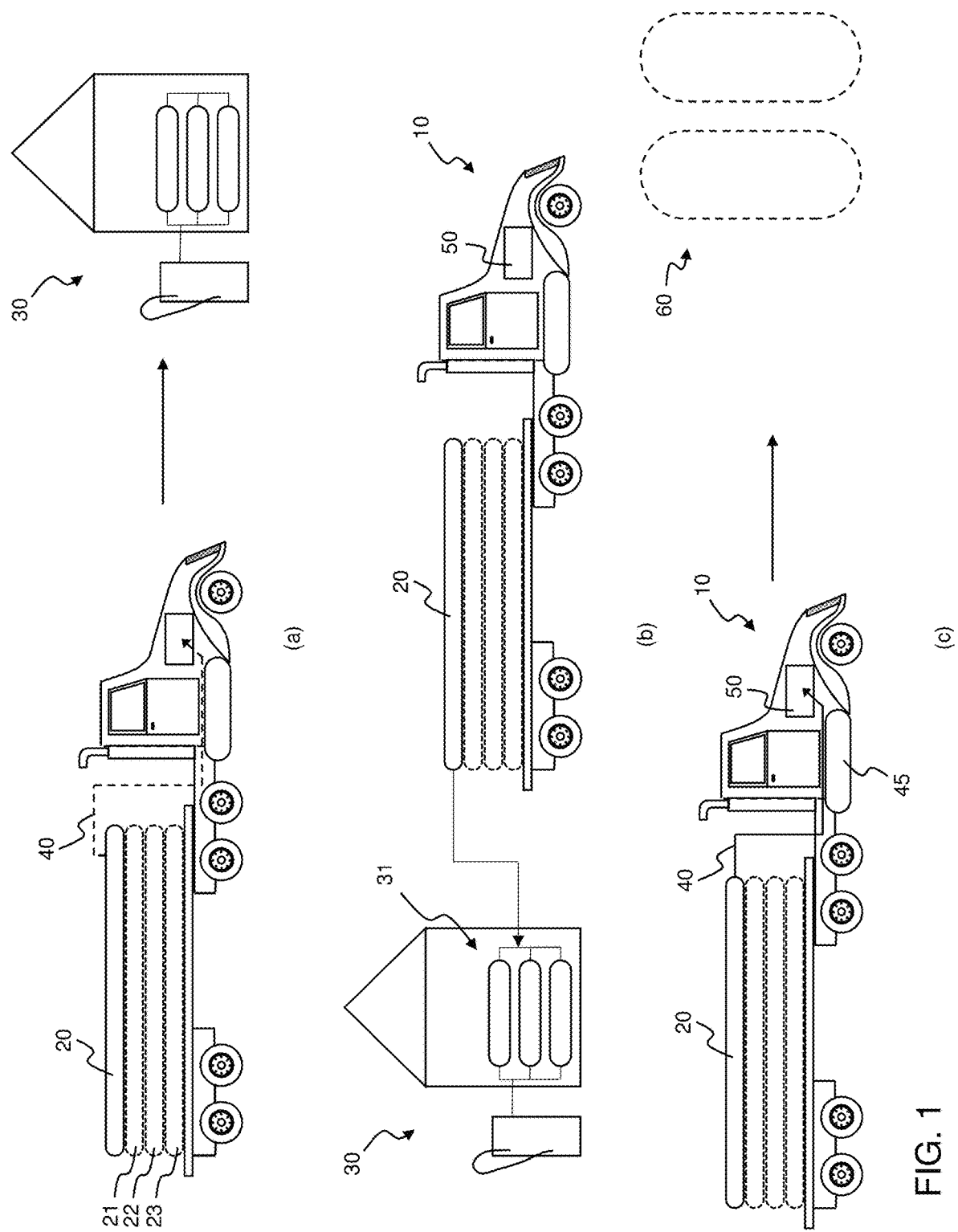
FIG. 1 is a schematic illustrating distribution of a fuel gas.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from the scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

The term "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The phrase "at least one of" preceding a list of features or entities means one or more of the features or entities in the list of entities, but not necessarily including at least one of each and every entity specifically listed within the list of entities and not excluding any combinations of entities in the list of entities. For example, "at least one of A, B, or C" (or equivalently "at least one of A, B, and C" or equivalently "at least one of A, B, and/or C") has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The term "plurality" means "two or more than two."

As used herein, "first," "second," "third," etc. are used to distinguish from among a plurality of steps and/or features, and is not indicative of the total number, or relative position in time and/or space unless expressly stated as such.

In the claims, letters may be used to identify claimed steps (e.g. (a), (b), and (c)). These letters are used to aid in referring to the method steps and are not intended to indicate the order in which claimed steps are performed, unless and only to the extent that such order is specifically recited in the claims.

The present disclosure relates to a fuel gas distribution method. A fuel gas is any one of a number of fuels that under ordinary conditions are gaseous. The fuel gas may comprise at least one of hydrogen and methane. The fuel gas may be industrial grade hydrogen having a hydrogen concentration meeting established hydrogen fuel cell purity standards, or for example, at least 99.97 vol. %. The fuel gas may be natural gas comprising methane. The natural gas may have a methane concentration of at least 90 vol. %. The fuel gas may contain natural gas and hydrogen in a gas mixture.

The fuel gas distribution method is described with reference to FIG. 1 and FIG. 2.

The fuel gas distribution method comprises transporting a mobile fuel gas storage vessel 20 to a delivery location. The mobile fuel gas storage vessel 20 may be adapted to store compressed fuel gas. The mobile fuel gas storage vessel 20 may be one of a plurality of physically-connected mobile fuel gas storage vessels 20, 21, 22, and 23, for example, on a tube trailer. The plurality of mobile fuel gas storage vessels may comprise any number of fuel gas storage vessels.

The mobile fuel gas storage vessel 20 may be adapted to store liquid fuel gas. The mobile fuel gas storage vessel may be a fuel gas storage vessel on a trailer, for example, an insulated tanker for carrying liquid fuel gas. When the fuel gas is stored in the mobile fuel gas storage vessel 20 as a liquid fuel gas, a portion of the fuel gas is evaporated to form gaseous fuel gas during transport of the mobile fuel gas storage vessel 20 by the transport vehicle. The liquid fuel gas may be evaporated in an evaporator to form the gaseous fuel gas.

A connection 41 may be provided between the mobile fuel gas storage vessel 20 and the power generator 50 of the transport vehicle 10 for transfer of the gaseous fuel gas from the mobile fuel gas storage vessel 20 to the power generator 50 of the transport vehicle 10. The method may further comprise transferring the gaseous fuel gas from the mobile fuel gas storage vessel 20 to the power generator 50 of the transport vehicle 10 and consuming the gaseous fuel gas to generate power for the transport vehicle 10 while transporting the mobile fuel gas storage vessel 20 to the delivery location. Alternatively or in addition, the method may comprise transferring the gaseous fuel gas from the mobile fuel gas storage vessel 20 to a power generator 50 of the vehicle to generate auxiliary power.

The plurality of mobile fuel gas storage vessels 20, 21, 22, and 23 may have been transported to one or more other delivery locations and fuel gas off-loaded from one or more of the plurality of mobile fuel gas storage vessels 20, 21, 22, and 23 prior to being transported to this delivery location. The plurality of mobile fuel gas storage vessels 20, 21, 22, and 23 may be transported to one or more other delivery locations and fuel gas off-loaded from one or more of the plurality of mobile fuel gas storage vessels 20, 21, 22, and 23 after being transported to this delivery location.

The fuel gas distribution method comprises off-loading fuel gas from the mobile fuel gas storage vessel 20 at the delivery location until the mobile fuel gas storage vessel 20 has been depleted to a depletion level. The fuel gas may be off-loaded to a fuel gas dispensing station 30 at the delivery location. The off-loading may be, for example, carried out by transferring the fuel gas from the mobile fuel gas storage vessel 20 to fixed storage vessels 31 at the delivery location as shown in FIG. 1. The off-loading may be, for example, carried out by leaving the mobile fuel gas storage vessel 20 at the delivery location temporarily as shown in FIG. 2.

As shown in FIG. 1 where the off-loading is carried out by transferring the fuel gas from the mobile fuel gas storage vessel 20 to fixed storage vessels 31 at the delivery location, the step of off-loading comprises operatively connecting the mobile fuel gas storage vessel 20 to one or more fixed storage vessels 31 at the delivery location and transferring fuel gas from the mobile fuel gas storage vessel 20 to the one or more fixed storage vessels 31 at the delivery location. The one or more fixed storage vessels may be part of a fuel gas dispensing station. The fuel gas may be dispensed from the fuel gas dispensing station to a plurality of receiving vessels, for example fuel tanks of automobiles. The fuel gas may be transferred from the one or more fixed storage vessels to the plurality of receiving vessels.

After off-loading the fuel gas from the mobile fuel gas storage vessel 20 to the depletion level, the mobile fuel gas storage vessel 20 has a residual amount of gaseous fuel gas contained therein. The depletion level may be a "selected" depletion level, which is predetermined. The depletion level may be a "causal" depletion level, which is due to a physical limitation of how much fuel gas can be offloaded, for example, by pressure transfer or transfer using a pump/compressor. The residual amount of fuel gas may be decreased using a compressor during off-loading.

Off-loading fuel gas from mobile fuel gas storage vessels to fuel gas dispensing stations is known in the art, for example, from EP 3 249 281, EP 3 249 282, and EP 3 263 969.

Subsequent to off-loading fuel gas from the mobile fuel gas storage vessel 20, the mobile fuel gas storage vessel 20 may be transported by a transport vehicle 10 to a refilling station 60 to be refilled with fuel gas. The mobile fuel gas storage vessel 20 may be refilled with fuel gas at the refilling station 60. The transport vehicle may be, for example, a truck or tractor.

The transport vehicle 10 has an onboard power generator 50 that can utilize the same fuel gas type to generate power for some or all of the requirements of the transport vehicle 10. The power generator 50 can provide power for the powertrain of the transport vehicle and/or auxiliary power.

The transport vehicle may have an electric motor. Hydrogen may be used in a fuel cell to provide electricity for the electric motor. The fuel cell may constitute the power generator 50. The transport vehicle may be supplemented by battery power. The transport vehicle may operate using battery power until the mobile fuel gas storage vessel is depleted to the depletion level and then switch over to using the residual fuel gas. The transport vehicle may operate using fuel gas from a primary fuel gas storage vessel 45 fixed to the transport vehicle. The transport vehicle may operate using fuel gas from the primary fuel gas storage vessel 45 until the mobile fuel gas storage vessel 20 is depleted to the depletion level and then switch over to using the residual fuel gas. The residual fuel gas may be transferred from the mobile fuel gas storage vessel 20 to the primary fuel gas storage vessel 45. Alternatively, the residual fuel gas may be transferred from the mobile fuel gas storage vessel 20 directly to the power generator 50 of the transport vehicle 10, bypassing the primary fuel gas storage vessel 45.

The transport vehicle may have an internal combustion engine. Hydrogen or natural gas may be used in the internal combustion engine. The internal combustion engine may constitute the power generator.

The fuel gas distribution method comprises providing a connection 40 between the mobile fuel gas storage vessel 20 containing the residual amount of gaseous fuel gas and a power generator 50 of a transport vehicle 10 for transfer of gaseous fuel gas from the mobile fuel gas storage vessel 20 to the power generator 50 of the transport vehicle 10. The mobile fuel gas storage vessel 20 may be connected directly to the power generator 50 of the transport vehicle 10 or via the primary storage vessel 45.

Figure 2:
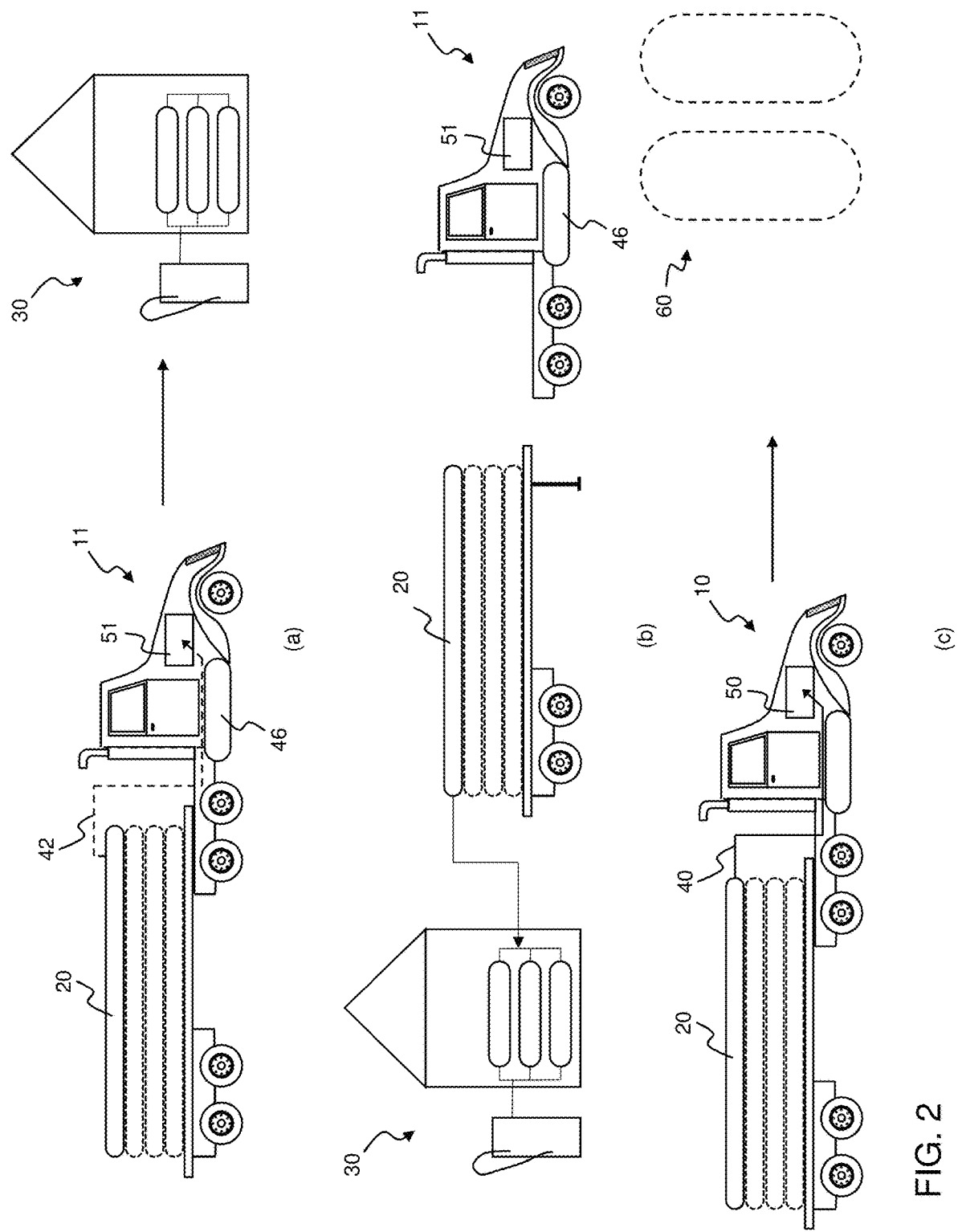
FIG. 2 is a schematic illustrating distribution of a fuel gas.

If the mobile fuel gas storage vessel has been left at the delivery location, as shown in FIG. 2, the mobile fuel gas storage vessel 20 may be connected, after off-loading at the delivery location, to the same transport vehicle that transported the mobile fuel gas storage vessel to the delivery location. The mobile fuel gas storage vessel 20 may alternatively be connected to a different transport vehicle than that which transported the mobile fuel gas storage vessel to the delivery location.

The fuel gas distribution method comprises transporting the mobile fuel gas storage vessel 20 using the transport vehicle 10 while transferring a portion of the residual amount of gaseous fuel gas from the mobile fuel gas storage vessel 20 to the transport vehicle 10 and consuming the portion of the residual amount of gaseous fuel gas in the power generator 50 to generate power for the transport vehicle 10 while transporting the mobile fuel gas storage vessel 20.

The fuel gas distribution method may comprise dispensing fuel gas from the dispensing station 30 to a plurality of receiving vessels (not shown). The receiving vessels may be onboard storage vessels on board respective vehicles (i.e. a fuel tank in an automobile). The fuel gas may be dispensed to the receiving vessels according to any known dispensing method. The dispensing method may comprise cascade filling.

The plurality of physically-connected mobile fuel gas storage vessels 20, 21, 22, and 23 may be transported to a second delivery location using the transport vehicle 10. The fuel gas may be off-loaded to a second fuel gas dispensing station (not shown) at the second delivery location. Fuel gas may be off-loaded from a second mobile fuel gas storage vessel 21 of the plurality of physically-connected mobile fuel gas storage vessels 20, 21, 22, and 23 at the second delivery location.

The fuel gas may be off-loaded until the second mobile fuel gas storage vessel 21 of the plurality of physically-connected mobile fuel gas storage vessels 20, 21, 22, and 23 has been depleted to a depletion level, the second mobile fuel gas storage vessel 21 having a residual amount of fuel gas contained therein. A connection may be provided between the second mobile fuel gas storage vessel 21 containing the residual amount of fuel gas and the power generator of the transport vehicle 10 for transfer of fuel gas from the second mobile fuel gas storage vessel 21 to the power generator 50 of the transport vehicle 10. The mobile fuel gas storage vessel 20 may be connected directly to the power generator 50 of the transport vehicle 10 or via the storage vessel 45. The plurality of physically-connected mobile fuel gas storage vessels 20, 21, 22, and 23 may be transported using the transport vehicle 10 while transferring a portion of the residual amount of fuel gas from the second mobile fuel gas storage vessel 21 to the transport vehicle 10 where the transport vehicle 10 consumes the portion of the residual amount of fuel gas in the power generator 50 to generate power for the transport vehicle 10.

As shown in FIG. 2, the mobile fuel gas storage vessel 20 may be transported to the delivery location using a second transport vehicle 11. The step of off-loading fuel gas may comprise detaching the mobile fuel gas storage vessel 20 from the second transport vehicle 11 at the delivery location and operatively connecting the mobile fuel gas storage vessel 20 to a fuel gas receiving coupler at the delivery location.

The fuel gas receiving coupler of the delivery location may be a receiving coupler for a fuel gas dispensing station. The fuel gas may be dispensed from the fuel gas dispensing station to a plurality of receiving vessels where the fuel gas is transferred (directly) from the mobile fuel gas storage vessel to the plurality of receiving vessels via the fuel gas dispensing station (without intermediate storage of the fuel gas in any fixed storage vessels of the fuel gas dispensing station) thereby depleting the fuel gas in the mobile fuel gas storage vessel to the depletion level.

Fuel gas may be dispensed using the well-known cascade filling technique.

After the mobile fuel gas storage vessel 20 has been depleted to a depletion level, the transport vehicle 10 may collect the mobile fuel gas storage vessel 20. The connection 40 may be provided between the mobile fuel gas storage vessel 20 containing the residual amount of gaseous fuel gas and the power generator 50 of the transport vehicle 10. The mobile fuel gas storage vessel 20 may be transported using transport vehicle 10 while transferring a portion of the residual amount of gaseous fuel gas from the mobile fuel gas storage vessel 20 to the transport vehicle 10 and consuming the portion of the residual amount of gaseous fuel gas in the power generator 50 to generate power for the transport vehicle 10.

The mobile fuel gas storage vessel 20 may be adapted to store liquid fuel gas. A portion of the liquid fuel gas may evaporate to form gaseous fuel gas during transport of the mobile fuel gas storage vessel 20 by the second transport vehicle 11 as shown in FIG. 2.

As shown in FIG. 2, a connection 42 may be provided between the mobile fuel gas storage vessel 20 and the power generator 50 of the second transport vehicle 11 for transfer of the gaseous fuel gas from the mobile fuel gas storage vessel 20 to the power generator 51 of the second transport vehicle 11. Gaseous fuel gas may be transferred from the mobile fuel gas storage vessel 20 to the power generator 51 of the second transport vehicle 11 and gaseous fuel gas consumed to generate power for the second transport vehicle 11 while transporting the mobile fuel gas storage vessel 20 to the delivery location. The mobile fuel gas storage vessel 20 may be connected directly to the power generator 51 of the transport vehicle 11 or via the primary storage vessel 46 fixed to the transport vehicle 11.

The fuel gas may be hydrogen. The power generator of the second transport vehicle may comprise a fuel cell. The second transport vehicle may be a fuel cell vehicle.

The invention claimed is:

1. A fuel gas distribution method comprising:
   transporting a mobile fuel gas storage vessel to a delivery location;
   off-loading fuel gas from the mobile fuel gas storage vessel at the delivery location until the mobile fuel gas storage vessel has been depleted to a depletion level, the mobile fuel gas storage vessel having a residual amount of gaseous fuel gas contained therein;
   providing a connection between the mobile fuel gas storage vessel and a power generator of a transport vehicle for transfer of gaseous fuel gas from the mobile fuel gas storage vessel to the power generator of the transport vehicle;
   transporting the mobile fuel gas storage vessel using the transport vehicle while transferring a portion of the residual amount of gaseous fuel gas from the mobile fuel gas storage vessel to the transport vehicle and consuming the portion of the residual amount of gaseous fuel gas in the power generator to generate power for the transport vehicle.

2. The fuel gas distribution method according to claim 1 wherein the fuel gas is off-loaded to a fuel gas dispensing station at the delivery location.

3. The fuel gas distribution method according to claim 2, the method further comprising
   dispensing fuel gas from the dispensing station to a plurality of receiving vessels;
   wherein each receiving vessel of the plurality of receiving vessels is an onboard storage vessel on board a respective vehicle.

4. The fuel gas distribution method according to claim 1 wherein the mobile fuel gas storage vessel is transported to a refilling station in the step of transporting the mobile fuel gas storage vessel using the transport vehicle, the method further comprising:
   refilling the mobile fuel gas storage vessel with fuel gas at the refilling station.

5. The fuel gas distribution method according to claim 1 wherein the mobile fuel gas storage vessel is one of a plurality of physically-connected mobile fuel gas storage vessels,
   wherein the plurality of physically-connected mobile fuel gas storage vessels are transported to a second delivery location using the transport vehicle, the method further comprising:
   off-loading fuel gas from a second mobile fuel gas storage vessel of the plurality of physically-connected mobile fuel gas storage vessels at the second delivery location.

6. The fuel gas distribution method according to claim 1 wherein the mobile fuel gas storage vessel is adapted to store liquid fuel gas,
   wherein the mobile fuel gas storage vessel is transported to the delivery location by the transport vehicle;
   wherein a portion of the liquid fuel gas evaporates to form vaporized gaseous fuel gas during transport of the mobile fuel gas storage vessel by the transport vehicle; and
   wherein the connection is provided between the mobile fuel gas storage vessel and the power generator of the transport vehicle for transfer of gaseous fuel gas from the mobile fuel gas storage vessel to the power generator of the transport vehicle;
   the method further comprising:
   transferring the vaporized gaseous fuel gas from the mobile fuel gas storage vessel to the power generator of the transport vehicle and consuming the vaporized gaseous fuel gas to generate power for the transport vehicle while transporting the mobile fuel gas storage vessel to the delivery location.

7. The fuel gas distribution method according to claim 1 wherein the mobile fuel gas storage vessel is transported to the delivery location using a second transport vehicle;
   wherein the step of off-loading fuel gas comprises:
   detaching the mobile fuel gas storage vessel from the second transport vehicle at the delivery location; and
   operatively connecting the mobile fuel gas storage vessel to a fuel gas receiving coupler at the delivery location.

8. The fuel gas distribution method according to claim 7 wherein the mobile fuel gas storage vessel is adapted to store liquid fuel gas,
   wherein a portion of the liquid fuel gas evaporates to form vaporized gaseous fuel gas during transport of the mobile fuel gas storage vessel by the second transport vehicle;
   the method further comprising:
   providing a connection between the mobile fuel gas storage vessel and a power generator of the second transport vehicle for transfer of the vaporized gaseous fuel gas from the mobile fuel gas storage vessel to the power generator of the second transport vehicle; and
   transferring the vaporized gaseous fuel gas from the mobile fuel gas storage vessel to the power generator of the second transport vehicle and consuming the vaporized gaseous fuel gas to generate power for the second transport vehicle while transporting the mobile fuel gas storage vessel to the delivery location.

9. The fuel gas distribution method according to claim 1 wherein the step of off-loading fuel gas comprises:
   operatively connecting the mobile fuel gas storage vessel to one or more fixed storage vessels at the delivery location; and
   transferring fuel gas from the mobile fuel gas storage vessel to the one or more fixed storage vessels at the delivery location.

10. The fuel gas distribution method according to claim 1 wherein the transport vehicle comprises a primary fuel gas storage vessel which is fixed to the transport vehicle, and wherein transferring the portion of the residual amount of fuel gas from the mobile fuel gas storage vessel to the transport vehicle comprises transferring fuel gas from the mobile fuel gas storage vessel to the primary fuel gas storage vessel.

11. The fuel gas distribution method according to claim 1 wherein the transport vehicle comprises a primary fuel gas storage vessel which is fixed to the transport vehicle, and wherein transferring the portion of the residual amount of fuel gas from the mobile fuel gas storage vessel to the transport vehicle comprises transferring fuel gas from the mobile fuel gas storage vessel directly to the power generator of the transport vehicle, bypassing the primary fuel gas storage vessel.

12. The fuel gas distribution method according to claim 1 wherein the power generator is an internal combustion engine for driving the transport vehicle and/or generating electric power for operating one or more electric components of the transport vehicle.

13. The fuel gas distribution method according to claim 1 wherein the power generator is a fuel cell for generating electric power for operating one or more electric components of the transport vehicle.

14. The fuel gas distribution method according to claim 13 wherein the transport vehicle comprises an electric motor for driving the transport vehicle, and the fuel cell delivers electric power to the electric motor.

* * * * *